June 23, 1936. W. SCRIMGEOUR Re. 20,014

HOLLOW FORGED VALVE AND METHOD OF MAKING THE SAME

Original Filed March 16, 1929

Inventor:

William Scrimgeour,

By Byron, Townsend & Brickenstein,

Attorneys.

Reissued June 23, 1936 Re. 20,014

UNITED STATES PATENT OFFICE 20,014

HOLLOW FORGED VALVE AND METHOD OF MAKING THE SAME

William Scrimgeour, Washington, D. C.

Original No. 1,950,953, dated March 13, 1934, Serial No. 347,671, March 16, 1929. Application for reissue November 18, 1935, Serial No. 50,481

25 Claims. (Cl. 29—156.7)

This invention relates to valves for use in engines, and particularly to poppet valves of the water-cooled variety such as are commonly used in internal combustion engines of the Diesel type. This application is a continuation in part of my copending application Ser. No. 259,541, filed March 6, 1928.

In Diesel engines it is the present practice, due to the excessive heat developed, and the heavy duty and sustained operation to which such engines are customarily subjected, to control the exhaust of the engine by means of hollow, water-cooled valves. Such valves, being ordinarily of the poppet type, are provided with enlarged or "mushroom" heads and relatively slender stems, and both the head and stem of the valve must be hollow to permit the introduction into, and circulation through, the valve of water for cooling purposes.

The bodies proper of all valves of this type (water-cooling feed pipes and their adjuncts omitted) are, so far as I am aware, made of at least two pieces, and these pieces are united in various ways apparently best suited to the purpose. Some are welded together, some are cast together and others are appropriately machined and assembled and then fixed in their assembled relation. But none of the valves for this service so far produced have been satisfactory in service for the reason that, after sustained service for any appreciable length of time, cleavage will occur between the parts of the valve at their seams or joint, and the cooling water will leak into the combustion spaces of the engine cylinders with the result of improper functioning of the engine and probable damage thereto.

Objects of my invention are to provide one-piece, seamless valves which are free from the objections noted above, and to provide a practical and economical method of making such valves.

To these ends my invention consists in a valve formed preferably of a heat-resisting, non-magnetic and non-corrodible alloy, having a hollow head and stem all in one integral piece in the strict sense, whereby the failures due to assembled valve structures are eliminated, and a durable, leak-proof, non-rusting, non-magnetic, and non-warping valve is provided, as I will proceed now to explain and finally claim.

These and other objects of the invention will be apparent from the following specification when taken with the accompanying drawing, in which.

Figure 1:
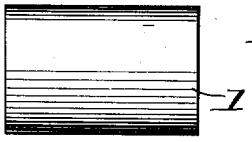
Figs. 1 and 2 are side and end views respectively of a blank from which the one piece valve may be manufactured.
Figure 2:
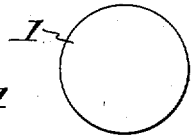

In the drawing, Figs. 1 and 2 illustrate a short cylindrical billet or blank 1 which has a diameter equal or approximately equal to the rough-finished diameter of the head of the valve. The length of the blank is determined by quantity of metal in the finished valve, proper allowance being made for the metal which is removed during the first, or machining step.

Figure 3:
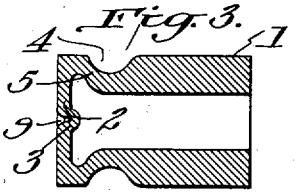
Figs. 3 and 4 are a longitudinal section and an end view of the blank after completion of the first step.
Figure 4:
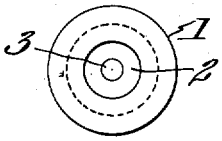

As indicated in Figs. 3 and 4, the blank 1 is bored out to leave an end wall 2 having a small boss 3 at the axis of the bore. The inner end of the bore is flared outwardly and the outer surface is machined, adjacent the closed end of the blank, to provide a peripheral groove or depression 4. The approximately conical wall 5 which lies between the groove 4 and the counterbored portion of the central passage has a slope substantially less than that required in the finished valve, and the thickness of this wall is somewhat greater than the rough-finished thickness of the rear face of the valve head.

The internal diameter of the billet 1, between its open end and the groove 4, is so chosen that the metal constituting the short, thick-walled cylindrical portion of the blank is sufficient to provide the extended thin walled stem of the valve.

Figure 5:
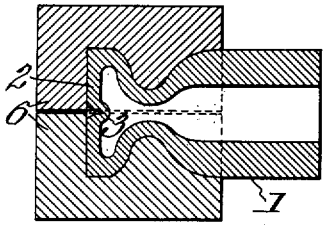
Figs. 5 and 6 are corresponding sectional and end views, respectively, of the blank and forging dies at the end of the succeeding step in the process of manufacture.
Figure 6:
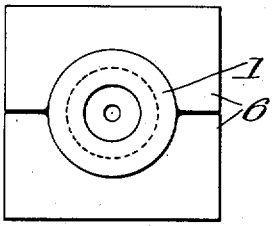

The next step in the process, as indicated graphically in Fig. 5, comprises die-shaping the closed end of the blank to rough-finish the end wall 2 and rear face of the valve head. This operation may be effected by dies 6, by a forging hammer, a spring forging die, or by similar known die stamping operations.

Figure 7:
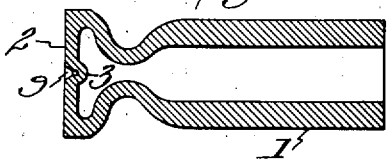
Figs. 7, 8 and 9 are sectional views through the blank at progressively later steps in the formation of the finished valve.

After the formation of the head, the elongated stem is produced by swaging or rolling the cylindrical section of the blank 1. In Fig. 7, the blank is shown as it appears at an intermediate stage, the swaging or rolling operations being repeated until the short thick-walled cylindrical portion of the blank is worked down to form an elongated stem 8 having a comparatively thin wall.

At the close of the swaging operations, or if necessary or desirable between successive steps, the stem may be rifle bored by first countersinking the end of the valve head at 9, the boss 3 on the internal face of the end wall providing such reinforcement that the end wall is not weakened by the countersink.

Figure 9:
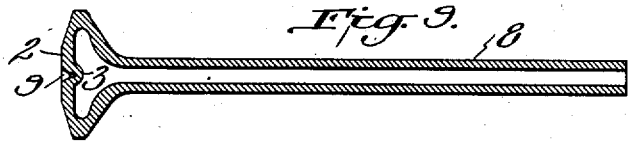

The valve is then ready for the machining and/or grinding operations which finish the valve to the desired size and shape. In Fig. 9, I have shown the stem 8 as of uniform cross-section throughout its length, but it will be apparent that suitable peripheral ridges or grooves may be machined in the stem to fit the valve for use with any desired type of guide sleeves, springs and the like.

Figure 10:
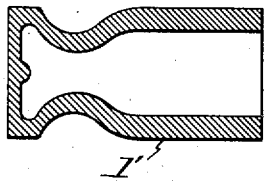
Fig. 10 is a longitudinal section through a blank composed of cast, ductile metal.

When the valve is to be formed of a metal or alloy which may be readily cast, the machining step may be omitted by casting the blank 1' to the form illustrated in Fig. 10, i. e., to substantially the same shape as that shown in Fig. 3.

Figure 11:
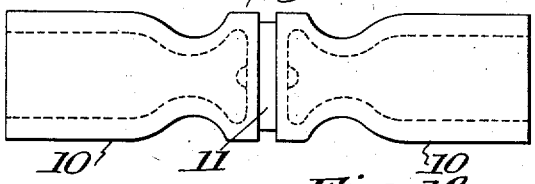
Fig. 11 is a side elevation of a blank from which two valves may be formed.

It is often convenient, particularly with comparatively small valves, to forge two valves at a time. The blank then takes the double-ended cup-shaped form illustrated in Fig. 11, and comprises what is, in effect, two valve blanks such as shown in Figs. 3 and 10, the closed ends of the blanks being joined by an integral cylindrical section 11. The section 11 is preferably of somewhat reduced diameter in order that it may indicate the control center of the forging. After die shaping the united valve blanks, they may be separated by machining away or sawing through the section 11, or if desired or convenient, both stems may be simultaneously drawn down through a pair of alined drawing dies before the valves are separated.

Figure 12:
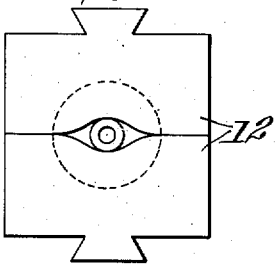
Fig. 12 is a diagrammatic end view of swaging dies.
Figure 8:
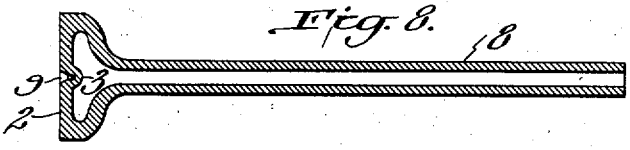

In Fig. 12, I have shown the blank in position in swaging dies 12, for working down the diameter of the cylindrical stem. The dies may be operated by a steam or electric hammer in the usual manner, and, as shown in the drawing, the die aperture is of approximately oval cross-section to permit some lateral flow of the metal during the swaging operation. The swaging operations are carried out in the usual manner, due care being exercised, of course, to prevent the dies from contacting with the head of the valve while the stem is being forged.

As an example of a metal which may be worked by die stamping and drawing to form a hollow one-piece seamless valve, attention is directed to the iron identified as "$CRS_2$" in Navy Department specifications, and which includes the other elements in the percentages stated below:

| C | Mn | P (max) | S (max) | Si | Ni | Cr | Cu (max) |
|---|---|---|---|---|---|---|---|
| .3-.5 | .4-.8 | .04 | .05 | .5-2.0 | 19.5-25 | 6.5-9.0 | 1.5 |

Iron of this composition is commercially known as "stainless iron", is non-magnetic and may be readily forged and drawn at temperatures between 2100° F. and 1750° F.

It is obvious that iron, steel and alloys having widely different chemical compositions may be used in the formation of hollow, one-piece valves when the metal is of such a nature that it may be die stamped and drawn.

Various changes in the form, material and superficial characteristics of the valve are deemed to be within the spirit of my invention and the scope of the following claims, it being understood that the invention resides in the hollow, one-piece, seamless valve formed of a single integral piece of metal, and its method of manufacture.

I claim:

1. A one-piece forged hollow valve of the poppet type comprising a hollow head, and a hollow stem integral with said head and of materially less diameter, said stem having been drawn down from a mass of metal which was initially of substantially the same diameter as said head.

2. A one-piece forged valve of the poppet type comprising a hollow head, and a stem integral with said head and of materially less diameter, said stem having been worked down from a mass of metal which was initially of substantially the same diameter as the head.

3. A one-piece, seamless, hollow valve of the poppet type substantially identical with one made by the hereindescribed process which comprises shaping the closed end of a short, thick-walled cylindrical blank having an external diameter of the order of that of the finished valve head to the approximate form of the valve head, and working down the short, thick-walled cylindrical portion of said blank to form an elongated, thin-walled stem.

4. A one-piece forged valve having a hollow head and substantially identical with one made by the hereindescribed process of pressure-shaping the closed end of a substantially cylindrical hollow blank to rough-finish said closed end as the hollow head of the valve, and working down the remaining portion of the blank to form an elongated, small diameter stem integral with the said hollow head.

5. A one-piece forged hollow valve substantially identical with one made by the hereindescribed process of die-shaping the closed end of a short, thick-walled tubular blank to rough-finish said closed end as the hollow head of said valve, and working down the short, thick-walled tubular portion of said blank to form a relatively long and thin hollow stem.

6. A poppet valve of the type having a hollow head of relatively large diameter and an elongated stem of relatively small diameter characterized by the fact that said head and stem consist of a single piece of metal which previously had the form of a tubular blank with one closed end, the metal at the closed end of the tubular blank having been pressure-shaped to the form of the hollow head and the remaining metal having been worked down to form an elongated stem integral with the head.

7. A poppet valve of the type having a hollow head of relatively large diameter and a long hollow stem of relatively small diameter characterized by the fact that said head and stem consist of a single, seamless piece of metal, and said stem was worked down from a short, large diameter tubular blank integral with said hollow head.

8. A hollow, one-piece and seamless poppet valve made by shaping the closed end of a short hollow metallic blank to the approximate form of the finished valve head, and by elongating the remainder of the blank to form a long, hollow stem.

9. A hollow, one-piece poppet valve made by casting steel in the form of a short hollow blank having one end closed and conforming to the approximate form of the hollow head of the finished valve, and by elongating the remainder of the blank to form a long, hollow stem integral with said hollow valve head.

10. A hollow, one-piece poppet valve made by counterboring a cylindrical blank and grooving the exterior adjacent the closed end, die-shaping the blank to give the closed end the form of the hollow head of the finished valve, and elongating the remainder of the blank to form a long, hollow stem integral with said hollow head.

11. A hollow, one-piece and seamless poppet valve made by shaping the closed end of a short, thick-walled cylindrical blank to the shape and approximate size of the hollow head of the valve, and working down the remainder of said blank to form a thin-walled elongated stem integral with said head.

12. A hollow, one-piece and seamless poppet valve made by die-stamping a relatively short, thick-walled blank having a diameter of the order of that of the head of the finished valve and having one closed end to rough finish said closed end of the blank as the head of said valve, and working down the remaining portion of the blank to form a long, relatively thin-walled hollow stem.

13. The method of forming a one-piece valve of the poppet type, which comprises forming a substantially cylindrical tubular blank having one closed end and a diameter materially in excess of that of the finished valve stem, pressure-shaping the closed end portion of said blank to the form of a hollow valve head, and working down the remaining portion of said blank to form an elongated stem of relatively small diameter.

14. The method of forming a one-piece, seamless, hollow valve of the poppet type, which comprises shaping the closed end of a short, thick-walled cylindrical blank to the shape and approximate size of the hollow head of the valve, and working down the remainder of said blank to form a thin-walled elongated stem integral with said head.

15. The method of forming a one-piece forged hollow valve of the poppet type which comprises die-stamping a relatively short, thick-walled blank having a diameter of the order of that of the head of the finished valve and having one closed end to rough finish said closed end of the blank as the head of said valve, and working down the remaining portion of the blank to form a long, relatively thin-walled hollow stem.

16. The process of forming a one-piece, seamless, hollow valve of the poppet type, which comprises die-pressing a short, thick-walled cylindrical blank having one closed end and an external diameter substantially equal to that of the finished valve head, to shape the peripheral wall adjacent said closed end to the approximate shape of the rear face of the finished head, and working down the remaining short-thick-walled cylindrical portion of the blank to form an elongated hollow stem.

17. The process as set forth in claim 16 wherein the working down of said cylindrical stem is effected by the alternating steps of working and of reaming the cylindrical stem.

18. The method of making a valve which comprises forming a cup-shaped blank of substantially the diameter of the desired valve head, and reducing the cylindrical portion of the blank from adjacent the base portion to substantially the diameter of the desired stem.

19. The method of making a valve which comprises forming a cup-shaped blank of substantially the diameter of the desired valve head, reducing the cylindrical portion of the blank from adjacent the base portion to substantially the diameter of the desired valve stem, and thereafter machining the part-engaging portions of the exterior of the valve.

20. The method of making a valve which comprises forming a cup-shaped blank of a diameter materially in excess of the diameter of the desired valve stem, and reducing the cylindrical portion of the blank from adjacent the base portion to form a hollow stem.

21. The method of making a valve as claimed in claim 20, wherein the base portion of the blank is pressure-shaped to form a hollow valve head.

22. The method of making hollow-headed poppet valves which comprises forming a double-ended cup-shaped blank having recesses extending inwardly from the opposite ends thereof to a central base portion, forming a pair of hollow head portions by swaging the sections of the blank surrounding the recesses to reduce the diameter adjacent the ends of the recesses, severing the blank through the said base section, and finishing each of the two pieces so formed as a separate valve.

23. The method of producing a valve which comprises forming a substantially cylindrical blank having recesses extending into the ends thereof, forming a pair of hollow head portions by swaging the portions of the blank surrounding the recesses to reduce the diameter adjacent the ends of the recesses, severing the blank through the portion between the recesses, and finishing each of the two pieces so formed as a separate valve.

24. In the manufacture of valves of the character described, the method comprising the steps of providing a blank having its greater diameter equal to that of the head portion of the finished valve without deforming the metal in said head portion, and then reducing a portion of said blank to a diameter and length equal to that of the stem portion.

25. In the manufacture of valves of the character described, the method comprising the steps of providing a blank having its greater diameter equal to that of the head portion of the finished valve without deforming the metal in said head portion, reducing a portion of said blank to a diameter and length equal to that of the stem portion of the valve, and then drilling out the interior of said stem portion.

WILLIAM SCRIMGEOUR.